United States Patent [19]
Bening et al.

[11] Patent Number: 6,075,097
[45] Date of Patent: Jun. 13, 2000

[54] PROCESS FOR PRODUCING CONJUGATED DIENE DIOLS USING CARBON DIOXIDE

[75] Inventors: Robert Charles Bening, Katy; John David Wilkey, Houston, both of Tex.

[73] Assignee: Shell Oil Company, Houston, Tex.

[21] Appl. No.: 09/080,999

[22] Filed: May 19, 1998

Related U.S. Application Data

[60] Provisional application No. 60/048,822, Jun. 6, 1997.

[51] Int. Cl.[7] .......................... C08C 19/02; C08F 293/00; C08F 36/00; C08F 36/06
[52] U.S. Cl. .................. 525/338; 525/314.1; 525/333.2; 525/331.9
[58] Field of Search ..................................... 525/338, 314, 525/333.2, 331.9

[56] References Cited

U.S. PATENT DOCUMENTS

| | | | |
|---|---|---|---|
| Re. 27,145 | 6/1971 | Jones | 260/880 |
| 4,417,029 | 11/1983 | Milkovich | 525/314 |
| 4,518,753 | 5/1985 | Richards et al. | 526/177 |
| 4,753,991 | 6/1988 | Bronstert | 525/98 |
| 4,970,254 | 11/1990 | Willis et al. | 525/314 |
| 5,166,277 | 11/1992 | Goodwin et al. | 525/338 |
| 5,391,663 | 2/1995 | Bening et al. | 526/178 |
| 5,393,843 | 2/1995 | Handlin, Jr. et al. | 525/332.8 |
| 5,405,911 | 4/1995 | Handlin, Jr. et al. | 525/139 |
| 5,416,168 | 5/1995 | Willis et al. | 525/333.2 |
| 5,552,493 | 9/1996 | Spence et al. | 525/314 |
| 5,773,521 | 6/1998 | Hoxmeier et al. | 525/316 |
| 5,780,551 | 7/1998 | Engel et al. | 525/236 |
| 5,854,314 | 12/1998 | St. Clair et al. | 523/416 |

FOREIGN PATENT DOCUMENTS

| | | | |
|---|---|---|---|
| 1135801 | 11/1987 | Japan | C08C 19/44 |
| 91/12277 | 8/1991 | WIPO | C08F 4/46 |

OTHER PUBLICATIONS

W.W. Yau, J.J. Kirkland, D.D. Bly, *Modern Size–Exclusion LiquidChromotography*, John Wiley & Sons New York, NY, 1979.

M.B. Huglin, *Light Scattering From Polymer Solution*, ET., Academic Press, New York, NY, 1972.

W. Kaye and A.J. Kavlik, *Applied Optics*, 12, 541, (1973).

M. L. McConnell, *American Laboratory*, 63, May 1978.

*Primary Examiner*—David W. Wu
*Assistant Examiner*—Tatyana Zalukaeva
*Attorney, Agent, or Firm*—Beverlee G. Steinberg

[57] ABSTRACT

A process for making hydrogenated polymers is presenting. Polymerization is initiated with a lithium initiator and one or more unsaturated monomers are polymerized to a polymer cement. The polymerization process is terminated and dry carbon dioxide is introduced to the polymer cement to make a $CO_2$-treated polymer cement. The $CO_2$-treated polymer cement is hydrogenated in the presence of a Ni/Al catalyst.

24 Claims, No Drawings

PROCESS FOR PRODUCING CONJUGATED DIENE DIOLS USING CARBON DIOXIDE

This application claims the benefit of U.S. Provisional Application No. 60/048,822, filed Jun. 6, 1997, the entire disclosure of which is hereby incorporated by reference.

FIELD OF THE INVENTION

This invention relates to anionic polymerization of unsaturated monomers to make polymers useful in adhesives, sealants and coatings. In particular, this invention relates to a process to produce hydrogenated conjugated diene diols using carbon dioxide.

BACKGROUND OF THE INVENTION

Anionic polymerization of conjugated dienes with lithium initiators, such as sec-butyllithium, and hydrogenation of residual unsaturation has been described in many references including U.S. Pat. No. Re. 27,145.

Many times it is desirable to functionalize polymerized conjugated dienes. The capping of living anionic polymers to form functional end groups is described in U.S. Pat. Nos. 4,417,029, 4,518,753, and 4,753,991. Of particular interest for one embodiment of the present invention are anionic polymers that are capped on one or more ends with hydroxyl, carboxyl, phenol, epoxy, or amine groups.

U.S. Pat. No. 5,391,663 describes a polymerization process using a protected functional initiator (PFI) having the structure

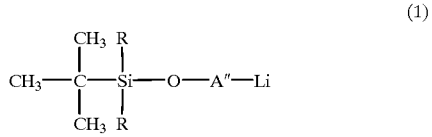

(1)

wherein each R is methyl, ethyl, n-propyl, or n-butyl and A" is an alkyl-substituted or non-substituted propyl bridging group, including —$CH_2$—$CH_2$—$CH_2$—(1,3-propyl), —$CH_2$—$CH(CH_3)$—$CH_2$—(2-methyl-1,3-propyl) and —$CH_2$—$C(CH_3)_2$—$CH_2$—(2,2-dimethyl-1,3-propyl), or an alkyl-substituted or non-substituted octyl bridging group, including —$CH_2$—$CH_2$—$CH_2$—$CH_2$—$CH_2$—$CH_2$—$CH_2$—$CH_2$—(1,8-octyl). Cleavage of the silicon-oxygen bond liberates the alcohol group, allowing the facile introduction of hydroxyl functionality at the beginning of the chain. Termination with the appropriate capping agent affords a route to a variety of α-, ω-telechelic polymers.

U.S. Pat. No. 5,416,168 describes a polymerization process using lithium compounds having the structure:

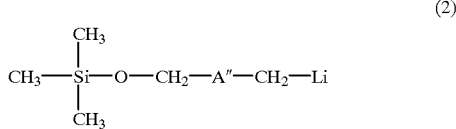

(2)

wherein A" is cyclohexyl or —CR'R"—, wherein R' is a linear alkyl having from 1 to 10 carbon atoms, and R" is hydrogen or a linear alkyl having from 1 to 10 carbon atoms.

When the PFI initiator is used to prepare telechelic hydrocarbon diols, there are a number of advantages gained by polymerizing isoprene, as opposed, for example, to polymerizing butadiene. The rate of side reactions involving the propagating anion and siloxane species derived from PFIs of structure (2) is slower for isoprene, making the preparation of high functionality diols much easier. The presence of the small amount of mono-functional molecules is a commercial disadvantage compared to available difunctional polymers. Producing polymers with a functionality of greater than 1.90 with butadiene using initiators of structure (2) requires careful control of reaction conditions. Initiators of structure (1) do not suffer from these side reactions, but are much more expensive and more difficult to convert to the desired alcohol (deprotect). Also, there is no need for precise microstructure control to avoid crystallinity in the final, hydrogenated product. However, hydrogenation of the isoprene after polymerization is very difficult. If the standard methanol termination protocol is used, several hundred ppm of Ni/Al catalyst are required to produce hydrogenated products of sufficiently low residual unsaturation. These high catalyst levels result in severe catalyst extraction and effluent treatment problems. When a highly functionalized product is desired, it would be highly desirable to develop a process which increases the ability of the diols, particularly isoprene diols, to be hydrogenated.

SUMMARY OF THE INVENTION

It has surprisingly been found that treatment of polymer cements with dry carbon dioxide following polymerization results in a product which may be hydrogenated to high levels of hydrogenation with significantly lower amounts of hydrogenation catalyst. Therefore, there is provided a process for making hydrogenated polymers, comprising the steps of:

polymerizing of one or more unsaturated monomers in the presence of a lithium initiator in a polymerization zone;

optionally adding one or more unsaturated monomers into the polymerization zone and continuing polymerization;

terminating the polymerization process and recovering a polymer cement;

introducing dry carbon dioxide to the polymer cement; and hydrogenating the $CO_2$-treated polymer cement in the presence of a hydrogenation catalyst.

There is further provided a process for preparing a dihydroxylated, saturated polyisoprene diol, comprising the steps of:

initiating polymerization of isoprene with a lithium initiator having the structure

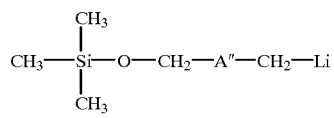

wherein A" is cyclohexyl or —CR'R"—, wherein R' is a linear alkyl having from 1 to 10 carbon atoms and R" is hydrogen or a linear alkyl having from 1 to 10 carbon atoms;

polymerizing isoprene to a polymer cement;

introducing a terminal hydroxyl group by reaction with ethylene oxide;

terminating the polymerization process;

introducing dry carbon dioxide to the polymer cement to make a $CO_2$-treated polymer cement;

hydrogenating the $CO_2$-treated polymer cement in the presence of a Ni/Al catalyst to a saturation greater than 90%;

recovering a linear or branched polymer having one or more terminal functional groups.

DETAILED DESCRIPTION

The process of the invention may be used to polymerize any unsaturated monomer. For ease of description, the example of a conjugated diene with a functionalized initiator will be used herein.

The polymerization of conjugated dienes with functionalized initiators having the structure:

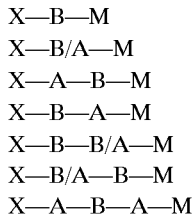

(2)

wherein A" is cyclohexyl or —CR'R"—, preferably —CR'R"—, wherein R' is a linear alkyl having from 1 to 10 carbon atoms, preferably methyl, and R" is hydrogen or a linear alkyl having from 1 to 10 carbon atoms, is described in U.S. Pat. No. 5,416,168, which description is incorporated herein by reference. The initiator of structure (2) may be used to prepare polymers of conjugated dienes such as isoprene or butadiene.

The alkali metal initiator process is well known. For example, U.S. Pat. Nos. 4,039,593 and Re. 27,145, which descriptions are incorporated herein by reference, describe the process for lithium initiators and conjugated dienes. Typical living polymer structures that can be made include:

X—B—M
X—B/A—M
X—A—B—M
X—B—A—M
X—B—B/A—M
X—B/A—B—M
X—A—B—A—M wherein B represents polymerized units of one or more conjugated diene hydrocarbons, A represents polymerized units of one or more vinyl aromatic compounds, B/A represents random polymerized units of the conjugated diene hydrocarbons and the vinyl aromatic monomers, M is an alkali metal, and X is the residue of the initiator. The living polymers are terminated as linear polymers, coupled to form branched polymers, or capped to form additional functional groups by conventional means such as addition of methanol, silicon tetrachloride, divinylbenzene, or ethylene oxide. When the PFI of Structure (2) is used in the process just described, M is lithium and X is a trimethylsilyl ether group.

PFIs are very active at room temperature. When an initiators of structure (2) is used, polymerization is preferably initiated at a temperature from 15° C. to 60° C., most preferably from 30° C. to 40° C. It is generally advisable to keep the polymerization temperature below about 100° C. or side reactions that limit capping efficiency may become important. When the conjugated diene undergoing polymerization is isoprene, it has been found helpful to maintain the polymerization temperature at approximately 30° C. for about 30 minutes, and then increase to 40° C.–50° C. Polymerizations can be carried out over a range of solids levels, preferably from about 5% wt to about 80% wt polymer, most preferably from about 10% wt to about 40% wt. For high solids polymerizations, it may be preferable to add the monomer in increments to avoid exceeding the desired polymerization temperature. If the initiator is to be added to the full monomer charge, it is preferable to run the polymerization between 10% wt and 20% wt solids.

Preparation of the unsaturated precursor of ethylene/propylene or ethylene/butylene diols is preferentially prepared by initiating the conjugated diene with a PFI having the structure

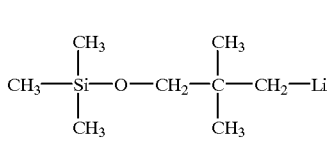

(3)

(3-lithio-2,2-dimethyl-1-trimethylsilyloxypropane) at about 20% solids in cyclohexane at about 30° C. If the conjugated diene undergoing polymerization is isoprene, polar modifiers may be added to influence the rate of initiation and polymerization, but are not required. Also, when polar modifiers are used, the concentration of the modifier must be kept low enough to avoid a significant increase in 3,4-addition. For example, when o-dimethoxybenzene (o-DMB) is used as the modifier, it has been found that it is preferable to limit the concentration to no more than 100 ppm.

Anionic polymerization is often terminated by addition of water to remove the lithium as lithium hydroxide (LiOH) or by addition of an alcohol (ROH) to remove the lithium as a lithium alkoxide (LiOR). Polymerization of conjugated dienes of the present invention is preferably terminated by adding about 1.1 molar equivalent of methanol, which converts most of the lithium of the PFI into lithium methoxide.

Polymers prepared from the PFI initiators described and terminated with water or alcohol will be mono-hydroxyl functional materials (mono-ols). To prepare polymers having an additional terminal functional group, about one molar equivalent of ethylene oxide is added to the living polymer chains just prior to termination to introduce the terminal hydroxyl group.

This termination step or neutralization step results in release of fine particles of lithium bases as described in U.S. Pat. No. 5,166,277 which is incorporated herein by reference. If it is desirable to functionalize the polymer, the lithium bases interfere with hydrogenation. It has been found that hydrogenation is greatly improved by introducing dry carbon dioxide to the polymer cement (the solution of polymer and hydrocarbon solvent) after the addition of the terminating agent. A preferably means of introducing the $CO_2$ is by bubbling an excess molar amount of the $CO_2$ through the cement. Without being tied to any particular theory, it is believed the $CO_2$ converts the lithium alkoxides to less-basic monoalkycarbonates.

Hydrogenation of polymers of conjugated dienes is typically accomplished with the use of nickel catalysts, as described in U.S. Pat. Nos. Re. 27,145 and 4,970,254 and U.S. patent application Ser. No. 07/785715 which are incorporated herein by reference. The preferred nickel catalyst is a mixture of nickel 2-ethylhexanoate and triethylaluminum. It is desirable to reach a residual unsaturation (RU) level of less than 0.2 meq/gm and a functionality approaching 2. However, hydrogenation of at least 90%, preferably at least 95%, of the unsaturation in isoprene polymers is difficult to achieve without use of high levels of nickel hydrogenation catalyst. In the process of the present invention, after the cement undergoes a $CO_2$ treatment, the treated cement is purged with inert gas, saturated with hydrogen, and the nickel catalyst is introduced. The $CO_2$ treatment allows the amount of nickel catalyst to be significantly reduced. For example, the amount of catalyst added to hydrogenate a isoprene-based $CO_2$-treated cement is between 100 ppm and 300 ppm, preferably 200 ppm, a substantially reduction in catalyst compared to that needed for nontreated isoprene-based polymer cements.

Saturated or unsaturated conjugated diene polymers having one or more terminal functional group selected from hydroxyl, carboxyl, phenol, epoxy, and amine groups can be used without solvents in many applications when the viscosity of the polymer is less than about 500 poise at mixing and application temperature. Linear hydrogenated isoprene polymers having two terminal hydroxyl groups per molecule and lower viscosity than 500 poise at mixing and application temperatures are produced by limiting the peak molecular weight to a range of from about 500 to about 20,000 and by ensuring that at least 80%, and preferably 90%, of the isoprene repeat units are the result of 1,4-addition.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yan, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

After polymerization and hydrogenation, the trimethylsilyl ether group at the front of the polymer chain is removed to generate the desired primary, neopentyl-type hydroxyl functional group. This step is often referred to as deprotection. A variety of processes for removal of the silyl protecting group are known; for a review, see T. W. Greene, "Protective Groups in Organic Synthesis", J. Wiley and Sons, New York, 1981. Deprotection preferably involves easily handled, relatively low toxicity, inexpensive reagents and mild, low cost process conditions. Reaction with tetrabutylammonium fluoride in THF, as described in WO 91 112277, is disadvantaged due to the high cost and toxicity of the reagents. In a preferred process, the cement is contacted with a solution of methanesulfonic acid, water, and an alcohol such as amyl alcohol at about 60° C. in the presence of oxygen, oxidizing the catalyst and hydrolyzing the trimethylsilyl protecting group. The solution is then washed with water to remove methanesulfonic acid and residues from the hydrogenation catalyst, stripped of solvent, and the desired diol polymer is isolated.

For some applications, such as coatings prepared by baked cures of the polymer with amino resins in the presence of a strong organic acid catalyst, it may be preferable to use the polymer in its "protected" form. The viscosity of the protected polymer is lower and conditions such as those described above should accomplish the deprotection (generate the alcohol) during the cure.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. TUFFLO® 6056 and 6204 oil made by Arco and process oils, e.g. SHELLFLEX® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% wt based on the solvent free portion of the formulation depending on the type of filler used and the application for which the coating or sealant is intended. An especially preferred filler is titanium dioxide.

Dihydroxylated conjugated diene polymers may also be blended with other polymers to improve their impact strength and/or flexibility. Such polymers are generally condensation polymers including polyamides, polyurethanes, vinyl alcohol polymers, vinyl ester polymers, polysulfones, polycarbonates and polyesters, including those, like polyacetones, which have a recurring ester linkage in the molecule, and those, like polyalkylene arylates, including polyalkylene terephthalates, having a structure formed by polycondensation of a dicarboxylic acid with a glycol. The blends may be made in the reactor or in a post compounding step.

Conjugated diene polymers produced as described above have the conventional utilities for terminally functionalized polymers of such as forming adhesives, coatings, and sealants. Additionally, the polymers may be used to modify polyurethanes, polyesters, polyamides, polycarbonates, and epoxy resins. The preferred polymers of the present invention are useful in adhesives (including pressure sensitive adhesives, contact adhesives, laminating adhesives and assembly adhesives), sealants (such as urethane architectural sealants, etc.), coatings (such as topcoats for automotive, epoxy primers for metal, polyester coil coatings, alkyd maintenance coatings, etc.), films (such as those requiring heat and solvent resistance), molded and extruded thermoplastic and thermoset parts (for example thermoplastic injection molded polyurethane rollers or reaction injection molded thermoset auto bumper, facie, etc.). The products should be especially useful in applications such as thermoplastic polyurethanes where functionalities of at least 1.95 are required.

The present invention is further described by the following examples. The examples are not intended to limit the present invention to specific embodiments.

EXAMPLES

Example 1

A precursor isoprene polymer, Polymer 1, was prepared at 20% solids in the presence of 100 ppm o-dimethoxybenzene (o-DMB).

Polymer 1 was prepared by charging 375 g (5.07 moles) of isoprene, 1270 g of cyclohexane, and 18.7 g of 1% o-DMB (100 ppm) into a 3 liter glass autoclave. The reactor was heated to 30° C. and 156.92 g (0.11 moles) of a 11.75% wt solution of protected functional initiator structure 3, described above, was added to the autoclave using a transfer bomb; to insure quantitative transfer, the initiator bomb was flushed with 44 g of cyclohexane. The autoclave bath was maintained at 30° C. for 30 minutes and then the temperature was allowed to rise to a maximum temperature of 55° C. after 28 additional minutes. The temperature was lowered to 44° C. and 8.62 g (1.8 equivalent) ethylene oxide was added. After an hour had passed, 5.6 ml (1.6 equivalent) methanol was added at an autoclave temperature of 40° C. The polymer a number average molecular weight ($M_n$) of 4,400 as measured by gel permeation chromatography (GPC) calibrated with polyisoprene standards having known peak molecular weights. The polymer was found to have 12% 3,4 repeat units as measured by $^1$H NMR.

943.7 g of Polymer 1 was drained into a 2 liter (½ gallon) jug and $CO_2$ was bubbled through for 15 min. The $CO_2$-treated cement was placed in a 4 liter (1 gal) autoclave and heated to 60° C. 15.54 g of 6300 ppm Ni/Al catalyst (100 ppm) was added. After 90 min., 88% of the olefin groups were saturated; 92% were saturated after 4 hours. An additional 50 ppm of catalyst was added and, after an additional hour of reaction, conversion had reached 94% (RU=0.89 meq/g).

Example 2

A second precursor isoprene polymer, Polymer 2, was prepared at 20% solids in the presence of 100 ppm o-DMB.

Polymer 2 was prepared by charging 375 g (5.5 moles) of isoprene, 1300 g of cyclohexane, and 18.7 g of 1% o-DMB (100 ppm) into a 3 liter glass autoclave. The reactor was heated to 25° C. and 163.14 g (0.12 moles) of a 11.9% wt solution of PFI was added to the autoclave, along with a 44 g cyclohexane flush, as described in Example 1. The autoclave bath was set at 25° C. for 68 minutes and then the temperature was allowed to rise to a maximum temperature of 51° C. after about 40 additional minutes. After about 189 minutes of polymerization, 5.94 g (1.1 equivalents) ethylene oxide was added at a temperature of 43° C. After 20 min, 5.6 ml (1.5 equivalent) methanol was added at a temperature of 41° C. Ten minutes later about half of the cement was drained into a 2 liter (½ gal) jug. After an additional 10 minutes, $CO_2$ was added to the remaining cement in the autoclave. The $CO_2$ treatment continued for about 45 minutes. The polymer had an $M_n$ of 3,870 as measured by GPC and 12% 3,4 repeat units as measured by $^1$H NMR.

830.7 g of the $CO_2$-treated sample of Polymer 2 (Polymer 2a) was placed in a 4 liter (1 gal) autoclave and heated to 60° C. 26.63 g of 6300 ppm Ni/Al catalyst (200 ppm) was added. After four minutes the bath was increased to 80° C. After 15 minutes the sample was 95% saturated. The reaction then slowed and 97.5% conversion was reached by 1 hour, 98.5% (RU=0.21 meq/g) in 4 hours. An additional 50 ppm of catalyst resulted in 98.6% conversion (RU=0.2 meq/g) after 5 hours hydrogenation time. The sample was treated with aqueous methane sulfonic acid in the presence of n-pentanol, followed by washing with deionized water and removal of the solvent. The resultant diol had a functionality of 1.93 as measured by $^1$H NMR.

1067.6 g of the untreated sample of Polymer 2 (Polymer 2b) was placed in a 4 liter (1 gal) autoclave and heated to 60° C. 33.07 g of 6300 ppm Ni/Al catalyst (200 ppm) was added. After four minutes the temperature had increased to 98° C. After 15 minutes, the sample was only 85% saturated. At 4½ hours and additional 8.14 g (50 ppm) catalyst was added, resulting in a final conversion of 91% at 5½ hours. The results are shown in the Table.

Example 3

A precursor isoprene polymer, Polymer 3, was prepared at 20% solids.

Polymer 3 was prepared by charging 375 g (5.5 moles) of isoprene and 668.26 g of cyclohexane into a 3 liter glass autoclave. The reactor was heated to 30° C. and 163.0 g (0.12 moles) of a 11.9% wt solution of PFI was added to the autoclave, along with a 44 g cyclohexane flush, as described above. The autoclave rose to a maximum temperature of 55° C. after 118 minutes. The temperature was lowered to 46° C. and 6.86 g (1.3 equivalents) ethylene oxide was added at 131 minutes. After thirty more minutes, 5.6 ml (1.5 equivalents) methanol was added at an autoclave temperature of 40° C. After 45 min, about half of the cement was drained into a 2 liter (½ gal) jug and 10.18 g of 1% o-DMB (100 ppm) was added to this sample, which was then stirred for 15 minutes at 40° C. Polymer 3 had an $M_n$ of 4,290 as measured by GPC. The polymer was found to have 8% 3,4 repeat units as measured by $^1$H NMR.

968.6 g of the o-DMB modified sample, Polymer 3a, was placed in a 4 liter (1 gal) autoclave and heated to 60° C. 31.26 g of 6300 ppm Ni/Al catalyst (200 ppm) was added. The sample reached a conversion of 57% in 15 minutes, 70% in one hour, 76% in two hours, and 80% in three hours.

955.7 g of the unmodified sample, Polymer 3b was placed in a 4 liter (1 gal) autoclave and heated to 60° C. 30.78 g of 6300 ppm Ni/Al catalyst (200 ppm) was added. The sample reached a conversion of 50% in 15 minutes, 65% in one hour, 72% in two hours, and 77% in three hours. The results are shown in the Table.

Example 4

A precursor isoprene polymer, Polymer 4, was prepared at 20% solids.

Polymer 4 was prepared by charging 375 g (5.5 moles) of isoprene and 1300 g of cyclohexane into a 3 liter glass autoclave. The reactor was heated to 20° C. and 135.45 g (0.12 moles) of a 14.37% wt solution of PFI was added to the autoclave, along with a 44 g cyclohexane flush, as described above. The autoclave bath was allowed to rise to a maximum temperature of 59° C. after about 35 minutes. After about 45 minutes of polymerization, 6.82 g (1.3 equivalents) ethylene oxide was added at a temperature of 48° C. After 30 min 6.0 ml (1.6 equivalent) methanol was added at a temperature of 45° C. After 15 min, about half of the cement was drained into a 2 liter (½ gal) jug. Carbon dioxide was then added to the remaining cement in the autoclave. The $CO_2$ treatment continued for about 45 minutes. The polymer had an $M_n$ of 4,090 as measured by GPC and 8% 3,4 repeat units as measured by $^1H$ NMR.

899 g of the $CO_2$-treated polymer, Polymer 4a, was placed in a 4 liter (1 gal) autoclave and heated to 60° C. 28.3 g of 6300 ppm Ni/Al catalyst (200 ppm) was added. The sample reached a conversion of 95% in 15 minutes, 98.5% in one hour, 98.9% (RU=0.16 meq/g) in two hours, and 99.1% (RU=0.13 meq/g) in three hours.

917 g of the untreated polymer, Polymer 4b, was placed in a 4 liter (1 gal) autoclave and heated to 60° C. 29.3 g of 6300 ppm Ni/Al catalyst (200 ppm) was added. The sample never reached adequate conversion, proceeding to 66% in 15 minutes, 79% in one hour, 84% in two hours, and 86% (RU=2.0 meq/g) in three hours. The results are shown in the Table.

Comparative Example 5

450 g (6.6 moles) of isoprene and 4050 g of cyclohexane were charged into a 2 gal stainless steel autoclave. The reactor was heated to 30° C. and 172 g of a 11.7% wt solution of PFI in cyclohexane (0.112 moles) was added. After about 9 minutes, the reaction temperature was increased to about 60° C. and polymerization was allowed to continue for about 40 minutes. After 40 minutes, the reactor was cooled to about 40° C. and 20 g (4 equivalents) of ethylene oxide was added. After 30 minutes, 16 g (1.1 equivalents) of 2-ethylhexanol was added. GPC analysis indicated a number average molecular weight of 4,350.

An aliquot of the solution was vacuum dried to remove the solvent. 80 g of the resulting polymer were added to a two liter extraction flask containing 720 ml of cyclohexane. A solution containing 1.0 g water and 6.5 g anhydrous methanesulfonic acid in 138 g isopropanol was then added. The resulting slightly hazy solution was stirred for 2 hours at about 50° C. The sample was washed with one aliquot of 1 N aqueous potassium carbonate and two aliquots of deionized water (about 750 ml each). 200 g of isopropanol was added to aid in separation of the organic and aqueous phases. The pH of the aqueous phase after the fourth water wash was about 7. The polymer solvent was removed in a rotary evaporator, leaving a slightly yellow, clear liquid.

A 780 g aliquot of the polymer cement (15% solids in cyclohexane) was charged into a 4 liter high-pressure stainless steel autoclave and diluted to 7.5% solids by the addition of 780 g of cyclohexane. The solution was heated to 40° C. and sparged with hydrogen for 30 minutes. After sparging the reactor was then filled with hydrogen to a pressure of 700 psig. An initial aliquot of Ni/Al catalyst solution, sufficient to bring the nickel concentration in solution to 400 ppm, was pressured into the reactor. The reaction temperature was ramped to 75° C. over 30 minutes and held at this temperature for 2.5 hours with constant agitation. Total reaction time was 3 hours. Ozone titration indicated 96% hydrogenation of the butadiene unsaturation (final RU=0.47 meq/g).

Comparative Example 6

920 g of a 20% solution of an isoprene polymer prepared as described in Example 5 was placed in a 2 liter resin kettle, heated to 55° C., and contacted with 300 g of 3 % wt aqueous phosphoric acid for 20 minutes at 400 rpm. After settling overnight, the aqueous layer was removed, and the polymer was recovered by evaporation of the solvent. The product was then redissolved in clean cyclohexane to a concentration of 20% wt and hydrogenated to 98.6% conversion (RU=0.19 meq/g) in 4 hours in the presence of 200 ppm Ni.

TABLE

|  | Molecular Weight[a] | 3, 4 Repeat Units[b] (%) | Amount Catalyst Added | % Conversion at Hydrogenation Time | Residual Unsaturation (meq/g) |
|---|---|---|---|---|---|
| Polymer 1 | 4400 | 12 | 100 ppm | 88% at 90 min | 1.68 |
| o-DMB modifier |  |  | +0 ppm | 92% at 4 hours | 1.10 |
| $CO_2$ treatment |  |  | +50 ppm[c] | 94% at 5 hours | 0.89 |
| Polymer 2a | 3870 | 12 | 200 ppm | 95% at 15 min | 0.73 |
| o-DMB modifier |  |  | +0 ppm | 97.5% at 1 hour | 0.36 |
| $CO_2$ treatment |  |  | +0 ppm | 98.5% at 4 hours | 0.21 |
|  |  |  | +50 ppm[c] | 98.5% at 5 hours | 0.2 |
| Polymer 2b | 3870 | 12 | 200 ppm | 85% at 15 min | 2.12 |
| o-DMB modifier |  |  | +0 ppm | 91% at 1 hour | 1.25 |
| No $CO_2$ treatment |  |  | +0 ppm | 91% at 4 hours | 1.25 |
|  |  |  | +50 ppm[c] | 91% at 5 hours | 1.25 |
| Polymer 3a[d] | 4290 | 8 | +200 ppm | 57% at 15 min | 6.24 |
| o-DMB modifier |  |  |  | 70% at 1 hour | 4.25 |
| No $CO_2$ treatment |  |  |  | 76% at 2 hours | 3.41 |
|  |  |  |  | 80% at 3 hours | 2.91 |
| Polymer 3b | 4290 | 8 | 200 ppm | 50% at 15 min | 7.23 |
| No modifier |  |  |  | 65% at 1 hour | 5.10 |
| No $CO_2$ treatment |  |  |  | 72% at 2 hours | 4.06 |
|  |  |  |  | 77% at 3 hours | 3.49 |

TABLE-continued

| | Molecular Weight[a] | 3, 4 Repeat Units[b] (%) | Amount Catalyst Added | % Conversion at Hydrogenation Time | Residual Unsaturation (meq/g) |
|---|---|---|---|---|---|
| Polymer 4a No modifier CO$_2$ treatment | 4090 | 8 | 200 ppm | 95% at 15 min 98.5% at 1 hour 99.1% at 3 hours | 0.67 0.16 0.13 |
| Polymer 4b No modifier No CO$_2$ treatment | 4090 | 8 | 200 ppm | 66% at 15 min 79% at 1 hour 86% at 3 hours | 5.0 3.1 2.0 |
| Comparative Ex. 5 Water wash | 4350 | 8 | 400 ppm | 96% at 3 hours | 0.47 |
| Comparative Ex. 6 Settling | 4000 | 8 | 200 ppm | 98.6% at 4 hours | 0.19 |

[a]Number average molecular weight (MW) by GPC
[b]Repeat units by $^1$H NMR
[c]Added at 4 hours hydrogenation time
[d]Spiked with 100 ppm o-DMB just prior to hydrogenation It can be seen that a CO$_2$ treatment prior to hydrogenation (Polymer 1, 2a and 2b) allows hydrogenation to proceed to highly satisfactory conversion levels in relatively short reaction times, and with significantly less Ni catalyst than when no CO$_2$ treatment is used. This can be seen particularly clearly by comparing Polymer 2a to 2b, 4a to 4b; and Comparative Example 5 (at 400 ppm Ni) to CO$_2$-treated samples (at 100 to 200 ppm Ni).

We claim:

1. A process for making hydrogenated polymers, comprising the steps of polymerizing one or more unsaturated monomers in the presence of a lithium initiator in a polymerization zone;

terminating the polymerization process and recovering a polymer cement;

introducing dry carbon dioxide to the polymer cement to form a CO$_2$-treated polymer cement; and hydrogenating the CO$_2$-treated polymer cement in the presence of a hydrogenation catalyst.

2. The process according to claim 1, wherein a molar excess of the dry carbon dioxide is introduced to the polymer cement.

3. The process according to claim 1, wherein said one or more unsaturated monomers is one or more conjugated dienes.

4. The process according to claim 3, wherein the one or more conjugated dienes are selected from isoprene and butadiene.

5. The process according to claim 1, further comprising adding styrene into the polymerization zone and continuing polymerization.

6. The process of claim 1, wherein hydrogenation takes place to a saturation of greater than 90%.

7. The process according to claim 4, wherein the conjugated diene is isoprene.

8. The process according to claim 6, wherein the hydrogenation catalyst is a Ni/Al catalyst, and wherein about 100 ppm to about 300 ppm of the Ni/Al catalyst is used in the hydrogenation step.

9. The process according to claim 7, wherein at least 80% of the isoprene is polymerized by 1,4-addition.

10. The process according to claim 1, where the lithium initiator has the structure:

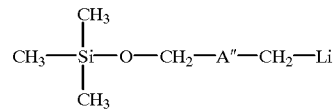

wherein A" is cyclohexyl or —CR'R"—, wherein R' is a linear alkyl having from 1 to 10 carbon atoms, and R" is hydrogen or a linear alkyl having from 1 to 10 carbon atoms.

11. The process according to claim 1, wherein polymerization takes place in the presence of a polymerization modifier.

12. The process according to claim 11, wherein the polymerization modifier is o-dimethoxybenzene.

13. The process according to claim 2, wherein the dry carbon dioxide is bubbled through the polymer cement.

14. The process according to claim 8, wherein greater than 90% conversion is reached within a range of from about 0.25 hour to about three hours.

15. The process according to claim 8, wherein greater than 90% conversion is reached in less than 1 hour.

16. The process according to claim 8, wherein hydrogenation takes place in the presence of 200 ppm of the Ni/Al catalyst and wherein saturation of greater than 90% is achieved in less than 30 minutes.

17. The process according to claim 16, wherein a saturation of at least 95% is achieved in less than 30 minutes.

18. A process for preparing a dihydroxylated, saturated polyisoprene diol, comprising the steps of:

initiating polymerization of isoprene with a lithium initiator having the structure

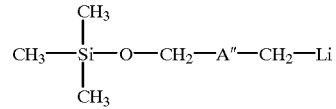

wherein A" is cyclohexyl or —CR'R"—, wherein R' is a linear alkyl having from 1 to 10 carbon atoms, and R" is hydrogen or a linear alkyl having from 1 to 10 carbon atoms;

polymerizing the isoprene to form a polymer cement;

terminating the polymerization process by reacting the polymer cement with ethylene oxide;

introducing dry carbon dioxide to the polymer cement to make a CO$_2$-treated polymer cement;

hydrogenating the CO$_2$-treated polymer cement in the presence of a Ni/Al catalyst to a saturation greater than 90%; and recovering a linear or branched polymer having one or more terminal functional groups.

19. The process according to claim 18, wherein at least 80% of the isoprene is polymerized by 1,4-addition.

20. The process according to claim 18, wherein a molar excess of the dry carbon monoxide is introduced to the polymer cement.

21. The process according to claim 18, wherein about 100 ppm to about 300 ppm of the Ni/Al catalyst is used in the hydrogenation step.

22. The process according to claim 21, wherein hydrogenation takes place in the presence of approximately 200 ppm of the Ni/Al catalyst and wherein saturation of greater than 90% is achieved in less than 30 minutes.

23. The process according to claim 22,, wherein a saturation of at least 95% is achieved in less than 30 minutes.

24. The process according to claim 20, wherein the dry carbon dioxide is bubbled through the polymer cement.

* * * * *